UNITED STATES PATENT OFFICE.

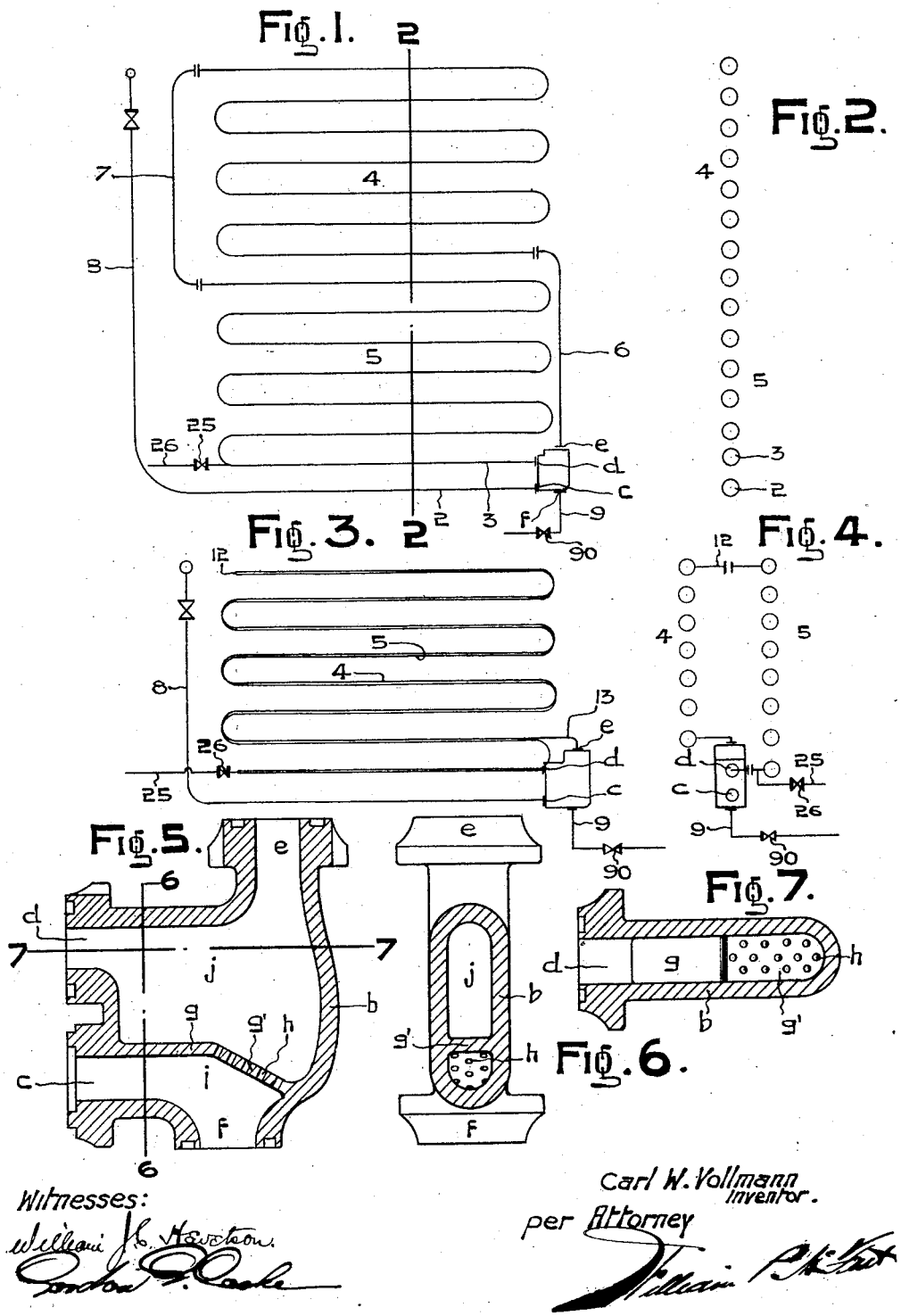

CARL WILHELM VOLLMANN, OF MONTREAL, QUEBEC, CANADA.

AMMONIA-CONDENSER.

1,259,810.     Specification of Letters Patent.    Patented Mar. 19, 1918.

Application filed April 12, 1917. Serial No. 161,457.

*To all whom it may concern:*

Be it known that I, CARL W. VOLLMANN, of the city of Montreal, Province of Quebec, Dominion of Canada, have invented certain new and useful Improvements in Ammonia-Condensers; and I do hereby declare that the following is a full, clear, and exact description thereof.

My invention relates particularly to ammonia condensers of the type comprising a condenser element having a closed circuit to which the ammonia gas is admitted and from which the surplus liquid ammonia is withdrawn. In condensing systems of this type an upward flow of the ammonia gas admitted to the lower portion thereof is caused by the condensation of the gas in the upper portion thereof which tends to create a vacuum and thereby causes a rapidity of the upward flow proportionate to the speed of condensation. It has been proposed to accelerate this flow by increasing the speed or pressure of the gas at the point at which it enters the condenser, this being effected by introducing the gas through a nozzle of relatively small bore. In my Patent No. 1,193,208 I disclose means for comminuting the gas in a mixing chamber included in the circuit, the globules of gas being distributed through a portion of the body of liquefied ammonia in the chamber and tending to rise rapidly owing to its buoyancy which causes an acceleration of the flow the convergence of the upper portion of the chamber causing an intimate admixture of the molecules of gas and liquid. The idea being in all condensers of this type to thoroughly mix the gas and liquid before they reach the top of the condenser where it was immediately subjected to the cooling or condensing medium when the latter was at its coldest degree. I have discovered, however, that although the mixing of the gas and liquid is intimately effected before it reaches the top of the condenser the gas is not condensed and absorbed before the liquefied portion of the mixture begins to descend in the condenser, but as the mixture travels along the top pipe the gaseous portion not absorbed by the liquid separates therefrom and accumulates along the top of the pipe thus reducing the efficiency of the condenser. The object of my present invention is to obviate the separation of the gaseous and liquefied portions of the mixture and to maintain the intimate relation of these elements until the gas is entirely absorbed and condensed by the liquid. To this end the invention may be said broadly to consist in permeating with ammonia gas the liquid ammonia flowing in the closed circuit, then subjecting the mixture to a zone of maximum cooling properties and having a drop in intensity of cold from the top to the bottom, the mixture being caused to traverse this zone from the mildest to the coldest portion thereof, thus obtaining complete condensation and liquefaction, the resultant liquid being then run through a chilling zone. A feature of the system in which this method is performed consists of a coil divided into condensing and chilling parts, the mixture being taken to the bottom of the condensing part and the liquid flowing from it to the top of the chilling portion; while in order to obtain maximum efficiency the mixer is specially designed to obtain a more intimate admixture of the gas and liquid in the mixing chamber and at the same time maintain the gas globules in a mixing sphere directly beneath the outlet from the chamber to the communicating pipe leading to the bottom of the condensing portion of the system, the essential effect obtained from this mixer being to utilize the dual advantage of the buoyancy of the gas globules and the suction caused by the condensation in the portion of the system where I concentrate the liquefaction.

For full comprehension, however, of my invention reference must be had to the accompanying drawings in which similar reference characters indicate the same parts, and wherein:

Figure 1 illustrates diagrammatically a system arranged according to my invention with the section in which the mixture is confined until liquefied, above the chilling section into which the liquid runs;

Fig. 2 is a similar view to Fig. 1 representing a sectional view taken on line 2—2 Fig. 1;

Figs. 3 and 4 are similar to Figs. 1 and 2 and illustrate my improved system with the liquefying and cooling sections arranged in parallel;

Fig. 5 is a detail sectional view of the mixer;

Fig. 6 is a vertical sectional view taken on line 6—6 Fig. 5, and

Fig. 7 is a horizontal sectional view taken on line 7—7 Fig. 5.

With the system, either as illustrated in Figs. 1 and 2 or 3 and 4, the gas is made to enter through the mixer illustrated in Figs. 5, 6 and 7.

This mixer is specially designed to coöperate with the balance of the system to locate the gas globules immediately beneath the outlet of the mixture. The casing of this mixture, indicated at $b$, has a gas inlet $c$, a liquid ammonia inlet $d$, an outlet $e$ at the top for the mixture of the gaseous and liquid ammonia and an outlet $f$ in its bottom for the surplus liquid ammonia. The interior of this casing is divided by a substantially horizontal partition $g$ between the gas and liquid inlets and having a portion $g'$ thereof adjoining the opposite side of the casing, which extends beyond the ammonia liquid outlet $f$, arranged obliquely to this outlet and provided with a series of small-bore holes $h$, the center one of which is in direct line with the center of the lower end of the outlet $e$, the other holes surrounding this central one and being directed toward the flared inner end of the bore of this outlet as indicated by dotted arrows in Fig. 5. The object is to confine this flow of comminuted gas to the direction of the outlet $e$, distributing the gaseous globules that, owing to their buoyancy, will lift the liquid they permeate direct to the outlet, the convergence of which brings the globules of liquid and gas into intimate contact which is augmented by the rolling action of the mixture therethrough. The mixer is thus divided into gas supplying and mixing chambers $i$ and $j$, respectively, the former of which forms the base of the casing while the permeation of the liquid is brought about in chamber $j$.

In each embodiment of the system the gas supplying pipe is indicated at 2, the liquid supplying pipe at 3, the liquefying section or coil at 4 and the cooling section or coil at 5. These coils are of the type presenting horizontal zig-zag pipes in vertical arrangement.

According to the arrangement illustrated in Figs. 1 and 2, the liquefying coil is located above the cooling coil and a mixture-conducting pipe 6 connects the outlet $e$ of the mixing chamber to the bottom pipe of the liquefying coil while a liquid-conducting pipe 7 connects the top pipe of the liquefying coil to the top pipe of the cooling coil the bottom pipe of which latter is connected to the liquid inlet of the mixer, thus completing the closed circuit. The gas pipe 8 leading from the refrigerating system, or other plant which may be served, is connected to the gas inlet $c$ and the pipe 9 through which the liquid ammonia may be drawn from my system is connected to the liquid ammonia outlet $f$ of the mixer.

In the embodiment of my system as illustrated in Figs. 3 and 4, the condensing and cooling sections are located beside and parallel to one another and the top pipes of each are connected to one another, and at one end by a pipe 12 and the bottom pipe of section 4 is connected by a pipe 13 to the outlet $e$ of the mixer, while the bottom pipe of section 5 is connected to the inlet $d$, the gas conducting pipe 2 being connected to inlet $c$ and the liquid drain pipe 9 to the liquid outlet $f$ of the mixer as in the above described embodiment.

The method of liquefying ammonia gas is carried on in my system, whether arranged as illustrated in Figs. 1 and 2 or 3 and 4, by the ammonia gas entering the base $i$ of the mixer and owing to the combined forces of the usual pressure in the refrigerating system the buoyancy of the gas and the suction in the liquefying section of the condensing and cooling apparatus the gas flows rapidly through the holes $h$ and owing to the particular arrangement of the partition $g'$ it is directed in a comminuted state into the portion of the mixing chamber $j$ contiguous to the upper surface of the perforated portion of the partition. This constantly replenished comminuted body of gas permeates the liquid ammonia with which the mixing chamber is flooded and rises rapidly to the outlet $e$, its lifting power accelerating the movement of the liquid. As the mixture enters the flared lower end of the outlet $e$, the particles of gas and liquid are crowded and in this intimate relation flow upwardly to the bottom of the liquefying section 4 the horizontal lengths and upward curves of the coil of which it traverses, to the top pipe whence it flows through the connecting pipe (pipe 7, Figs. 1 and 2 and pipe 12, Figs. 3 and 4) to the top pipe of the cooling section of the chilling coil down which it flows and enters the mixing chamber $j$. The liquid ammonia for use in the refrigerating or other system served is conducted to the usual receiver, (not shown) through a pipe 25 controlled by a valve 26; while the pipe 9 is controlled by a valve 90, and may be used either to drain the system or fill the system with liquid ammonia.

The usual method of picking up the heat units from the ammonia by water flowing over the coils is employed by me for my system, and when the coils are arranged as shown in Figs. 1 and 2 the same falling body of water may act on both coils; but if it is desired to produce liquid at a lower temperature the coils may be arranged as shown in Figs. 3 and 4 and a separate flow of water used for each coil.

The effect of causing the mixture existing during the first part of the method and the liquid resulting, to flow through this particular closed circuit is that owing to the fact of the gas and liquid particles being kept in intimate relation the liquefaction is promoted and the fact that this condition is maintained during the time that it is traversing the liquefying section from the bottom to the top thereof results in a complete absorption and liquefaction of the gas before it reaches the pipe connecting this section to section 5. It is pure ammonia liquor, consequently, which flows to the top of coil 5 and during the period of its flow through this section to the mixer its temperature is reduced to approximately that of the water flowing over this coil.

Under normal working conditions gas enters the base of the mixer at practically the same pressure as exists in the condensing and cooling members of the apparatus. Notwithstanding this substantial equality of pressure the force above mentioned existing within the apparatus causes the portions of the liquid ammonia permeated with gas, to rush with considerable velocity to the condensing or liquefying member 4 and through it to the top, its velocity being shaded down as liquefaction becomes effected, which result is obtained, as before explained, before the liquid leaves this condensing member; this result being due to the fact that the mixture flows upwardly against the stream of water and consequently penetrates deeper into the chilling influence as it flows to the top. The flow from the top of this member to the chilling coil 5 and through it to the mixing chamber is entirely by gravity.

Although in the description of the specific embodiments of my invention I have referred to vertical coils made up of zig-zag horizontal pipes I do not limit myself to this form of coil as the pipes may in the main be vertical or otherwise arranged provided the dual system of liquefying and chilling by utilizing the natural heat absorbing properties of the cooling agent more particularly described above, are employed, without departing from the spirit of my invention. The cooling agent may be otherwise employed than as a stream falling over the coils. This agent may be conducted through pipes inclosing the pipes of the coil or otherwise caused to absorb the heat of the ammonia, within the spirit of my invention.

What I claim is as follows:

1. In an ammonia liquefying and chilling apparatus the combination with a coil having a closed circuit divided into liquefying and chilling members the opposite ends of the circuit being coupled to a mixer with arrangement having one end of the circuit leading from the mixer to the bottom of the liquefying member, the other end leading from the bottom of the chilling member to the mixer, and the top of the liquefying member being connected to the top of the chilling member.

2. In an ammonia liquefying and chilling apparatus the combination with a coil having a closed circuit divided into liquefying and chilling members located one above the other, the opposite ends of the circuit being coupled to a mixer with arrangement having one end of the circuit leading from the mixer to the bottom of the liquefying member, the other end leading from the bottom of the chilling member to the mixer, and the top of the liquefying member being connected to the top of the chilling member.

3. In an ammonia liquefying and condensing apparatus the combination with a coil having a closed circuit divided into liquefying and chilling members located in parallel, the opposite ends of the circuit being coupled to a mixer with arrangement having one end of the circuit leading from the mixer to the bottom of the liquefying member, the other end leading from the bottom of the chilling member to the mixer, and the top of the liquefying member being connected to the top of the chilling member.

4. In an ammonia liquefying and chilling apparatus the combination with a coil for receiving gas-permeated liquid-ammonia and returning ammonia-liquid, of a mixer for permeating ammonia-liquid with ammonia-gas consisting of a casing having an inlet for liquid-ammonia and an inlet for ammonia-gas; a partition dividing the casing between the inlets and into a gas receiving chamber and a mixing chamber, the latter having an outlet and the partition having a series of perforations in the general direction of the outlet.

5. In an ammonia liquefying and chilling apparatus the combination with a coil for receiving gas-permeated liquid-ammonia and returning ammonia-liquid, of a mixer for permeating ammonia-liquid with ammonia-gas consisting of a casing having an inlet for liquid-ammonia and an inlet for ammonia-gas; a partition dividing the casing between the inlets and into a gas receiving chamber and a mixing chamber the latter having an outlet and the partition having a series of perforations in the general direction of the outlet and the said casing having a drain for the liquid-ammonia.

6. In an ammonia liquefying and chilling apparatus the combination with a coil for receiving gas-permeated liquid-ammonia and returning ammonia-liquid, of a mixer for permeating ammonia-liquid with ammonia-gas consisting of a casing having an inlet for liquid-ammonia and an inlet for ammonia-gas; a partition dividing the casing between the inlets and into a gas receiving chamber and a mixing chamber, the latter having an outlet and the partition having a series of perforations in the general direction of the outlet; and the said casing having a drain for the liquid-ammonia, the partition having a portion thereof beneath the mixture outlet inclined to present its lower face in a direction to intersect the natural direction of flow of the gas beneath it, and its upper face in a direction to tend the comminuted gas flowing therethrough to the direction of the mixing outlet.

In testimony whereof I have signed my name to this specification in the presence of two witnesses.

CARL WILHELM VOLLMANN.

Witnesses:
WILLIAM J. C. HEWETSON,
GORDON G. COOKE.

Copies of this patent may be obtained for five cents each, by addressing the "Commissioner of Patents, Washington, D. C."